US009403045B2

(12) United States Patent
Parsley

(10) Patent No.: US 9,403,045 B2
(45) Date of Patent: Aug. 2, 2016

(54) FIRE VEHICLE

(71) Applicant: Joseph Parsley, Town Creek, AL (US)

(72) Inventor: Joseph Parsley, Town Creek, AL (US)

( * ) Notice: Subject to any disclaimer, the term of this patent is extended or adjusted under 35 U.S.C. 154(b) by 0 days.

(21) Appl. No.: 14/572,021

(22) Filed: Dec. 16, 2014

(65) Prior Publication Data

US 2016/0166861 A1 Jun. 16, 2016

(51) Int. Cl.
*B60K 17/28* (2006.01)
*A62C 2/04* (2006.01)
*A62C 27/00* (2006.01)

(52) U.S. Cl.
CPC .. *A62C 2/04* (2013.01); *A62C 27/00* (2013.01)

(58) Field of Classification Search
CPC .......... B66C 9/14; B66C 13/12; B66C 23/36; B66C 23/62; B60K 6/22
USPC ........................................ 180/53.5, 53.8, 193
See application file for complete search history.

(56) References Cited

U.S. PATENT DOCUMENTS

| | | | | | |
|---|---|---|---|---|---|
| 1,806,823 | A * | 5/1931 | Reid | A01M 13/00 | 169/24 |
| 3,169,581 | A * | 2/1965 | Cummins | A62C 3/0292 | 152/450 |
| 5,836,398 | A * | 11/1998 | White | A62C 27/00 | 169/24 |
| 7,516,908 | B1 * | 4/2009 | Sack | A62C 3/0207 | 169/24 |
| 2003/0094287 | A1 * | 5/2003 | Demole | A62C 3/0221 | 169/24 |
| 2004/0050557 | A1 * | 3/2004 | Koopmann | A62C 27/00 | 169/24 |

* cited by examiner

*Primary Examiner* — Davis Hwu

(57) ABSTRACT

A fire extinguishing vehicle has at least one pan extending distally from a connection portion and forming a concave space within a middle portion, a first side wall, and a second side wall. The first and second side walls extend downwardly from opposite sides of the middle portion. The first and second side walls are shaped such that the middle portion slopes from a distal side where the side walls are longest to a proximal side where the side walls are shortest.

19 Claims, 5 Drawing Sheets

FIRE VEHICLE

CROSS-REFERENCE TO RELATED APPLICATIONS

Not Applicable

STATEMENT REGARDING FEDERALLY SPONSORED RESEARCH

Not Applicable

FIELD OF THE INVENTION

This invention relates to a device that can be driven to smother fires.

BACKGROUND OF THE INVENTION

Extinguishing fires and/or controlling fires is always of importance to those in the firefighting field as well as the backyard barbecuer. Fires can get out of control before one realizes it. A device that is effective in extinguishing fires in a simple and safe manner is desirable.

The instant invention, as disclosed within this application, fills this need. The art referred to and/or described within this application is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All US patents and applications and all other published documents mentioned anywhere in this application are incorporated herein by reference in their entirety. U.S. Pat. No. 8,443,910 is incorporated herein by reference in its entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In at least one embodiment of the invention the fire extinguishing vehicle has at least one pan, the at least one pan extending from a connection portion and forming a concave space within a middle portion, a first side wall, and a second side wall; the first and second side walls extending downwardly from opposite sides of the middle portion, the first and second side walls are shaped such that the middle portion slopes from a distal side where the side walls are longest to a proximal side where the side walls are shortest.

In at least one embodiment of the invention, the connection portion comprises at least one substantially horizontal float bar, at least one transition bar extending from the at least one float bar and connecting to the fire press body.

In some embodiments, the at least one transition bar extends from the at least one substantially horizontal float and connects to the low profile portion of the body rather than the higher profile pan portion of the body.

In at least one embodiment the body can have a top side and an under side with a concave portion extending from a perimeter portion. The body can have side perimeter portions extending between a proximal end and a distal end. The under side of the proximal end can have a perimeter portion that lies substantially in a single plane and a raised portion of the under side of the distal end of the perimeter portion can be raised from the single plane. It should be noted that "a perimeter portion that lies substantially in a single plane" can include embodiments wherein the perimeter portion includes ridges that meet or rest on the single plane while spaces between the ridges do not.

In at least one embodiment the raised portion of the under side of the distal end of the perimeter portion forms an upside down v-shape opening or an arch-like opening.

In at least one embodiment the device includes a fire retardant material applicator. The applicator can include a nozzle, multi-hole nozzle, a gravity drip opening, and/or a brush. In at least one embodiment, the applicator is in fluid communication with a fire retardant material container. This container can contain water, foam, and/or gel fire retardant material. There are many fire retardant materials that can be used. Some include class A foams, and class B foams which include a) synthetic foams and aqueous film forming foams which are water-based and frequently contain hydrocarbon-based surfactant such as sodium alkyl sulfate, and fluorosurfactant—such as fluorotelomers, perfluorooctanoic acid (PFOA), or perfluorooctanesulfonic acid (PFOS). They have the ability to spread over the surface of hydrocarbon-based liquids. Also, alcohol-resistant aqueous film forming foams (AR-AFFF) are foams resistant to the action of alcohols, able to form a protective film when they are present.

Protein foams can also be used, these foams contain natural proteins as the foaming agents. Unlike other synthetic foams, protein foams are bio-degradable. They flow and spread more slowly, but provide a foam blanket that is more heat resistant and more durable.

Protein foams include regular protein foam, fluoroprotein foam, alcohol resistant fluoroprotein foam, film forming fluoroprotein, and alcohol-resistant film forming fluoroprotein. The materials listed above are not intended to be in any way comprehensive. One skilled in the art can choose from a wide array of materials. The listing above is merely to provide some of the possible foams that may be used in different applications.

In at least one embodiment, the container is pressurized and is connected to the applicator with tubing. The container can be disposed on the handle or the body portion. The container can also be partially or entirely disposed within the handle or comprise a portion of the handle. In some embodiments the container can be worn by or attached to by the operator of the device. The container can be in a back pack or fastened to the belt or the like in some embodiments.

In some embodiments the container is not immediately attached to the handle, the body, or the operator (though attached by the tubing so that the container and the applicator are in fluid communication). The container can be in a separate location or can be moved along as is needed. The container can be moved on wheels or the like.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawing.

Figure 6A:
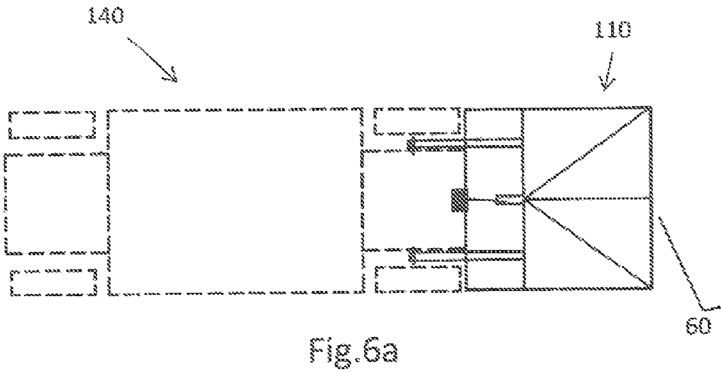

FIG. 6*a* is a top view of the inventive fire vehicle with the fire press attached in front and having a single opening.

Figure 6B:
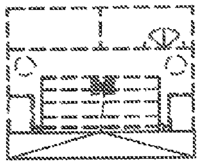

FIG. 6*b* is a front view of the inventive fire vehicle with the fire press attached in front and having a single opening.

Figure 7A:
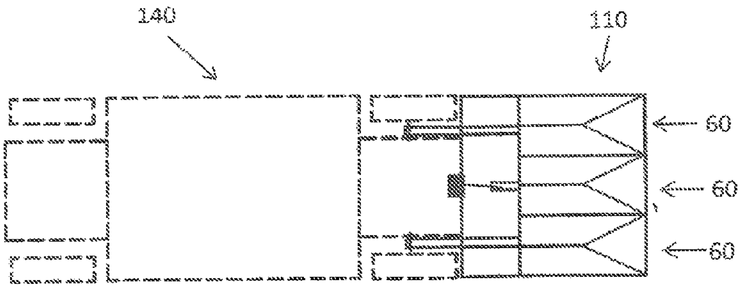

FIG. 7*a* is a top view of the inventive fire vehicle with the fire press attached in front and having multiple openings.

Figure 7B:
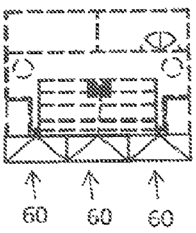

FIG. 7*b* is a front view of the inventive fire vehicle with the fire press attached in front and having multiple openings.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated. Also the Fire extinguishing vehicle can use the body designs and materials described in FIGS. 1-4 and the description but on a larger scale, at least for most applications.

Figure 1:
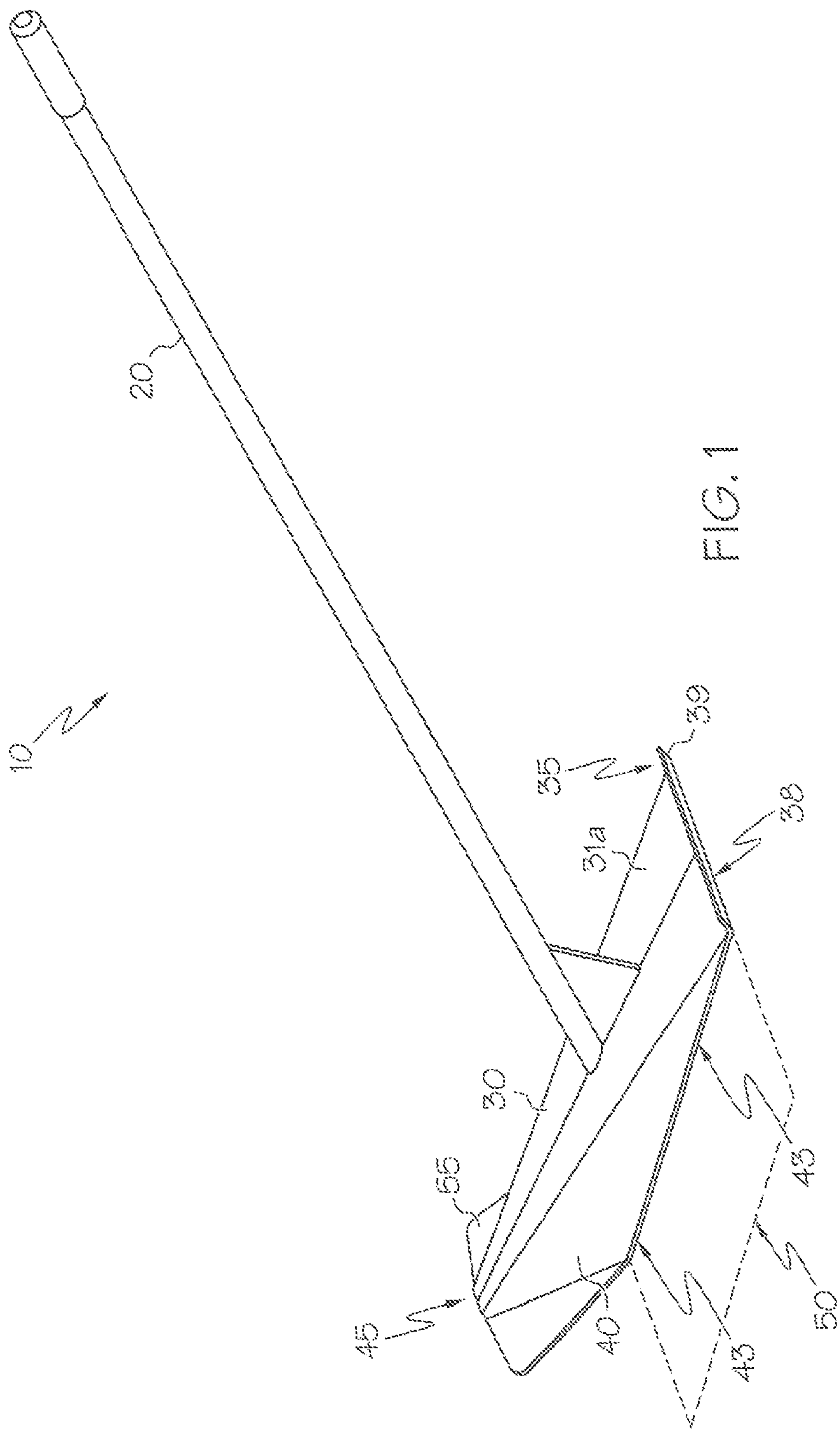
FIG. 1 is a schematic perspective view of an embodied fire extinguishing device showing the top side of the device.

In FIG. 1, an inventive embodiment of the fire extinguishing device 10 is shown. The device as shown has a handle 20 and a body 30. The body 30 has a proximal end 35 with proximal perimeter edge 38, sides 40 with side perimeter edges 43, and distal end 45. Proximal perimeter edge 38 and sides 40 lie substantially in reference plane 50. Distal end 45 includes portions that extend further from the reference plane 50 than does proximal end 35.

Figure 2:
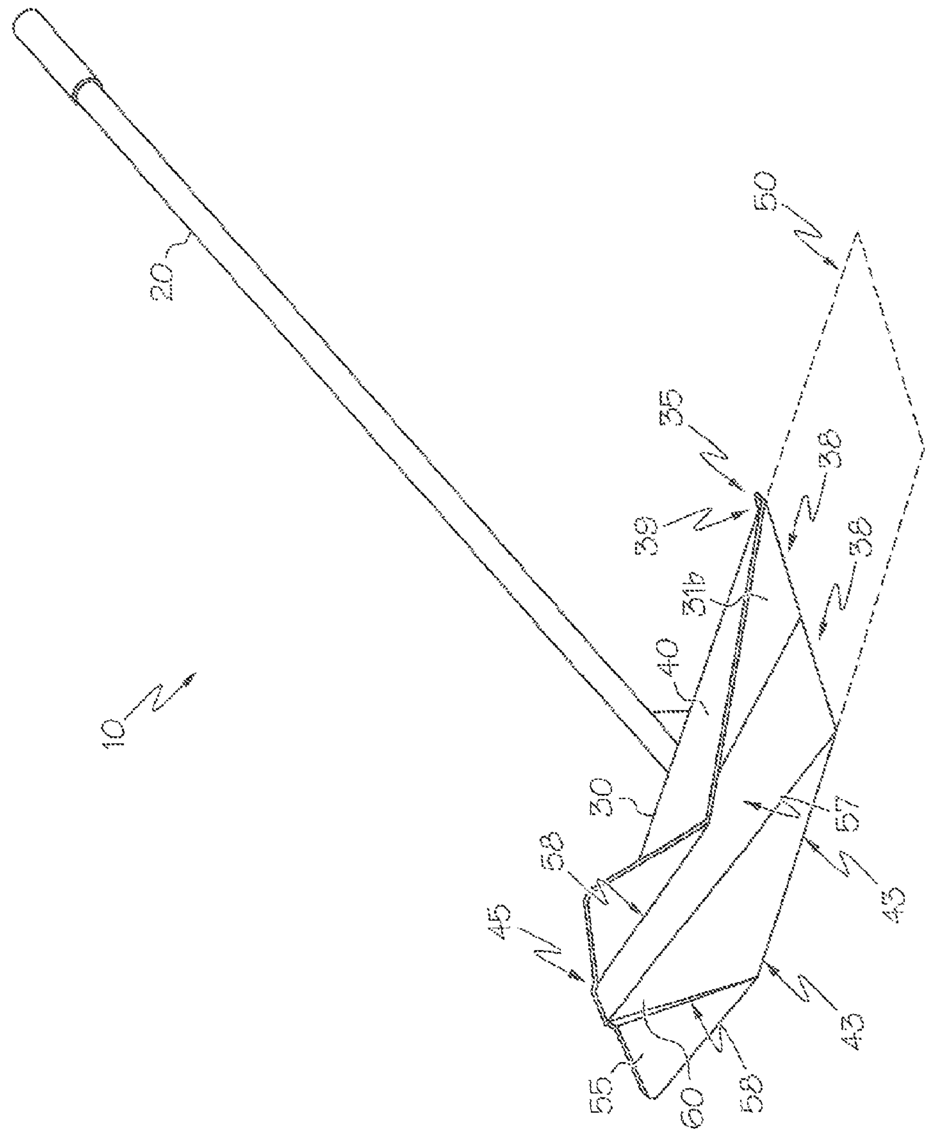
FIG. 2 is a schematic perspective view of an embodied fire extinguishing device showing the under side of the device.
Figure 3:
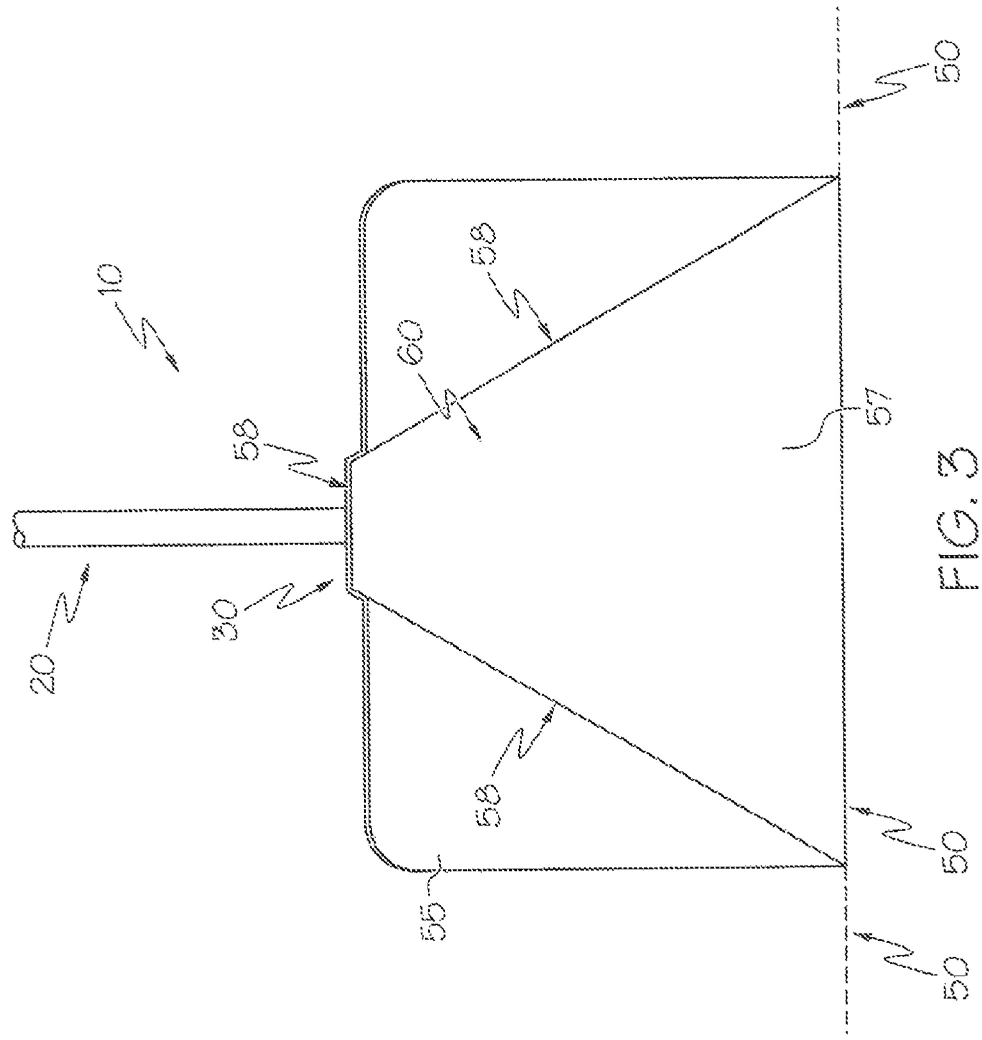
FIG. 3 is a front view of the device.

As shown in FIGS. 1-2, the body 30 has an upper side 31*a* and an underside 31*b*. As shown here 31*a* is a middle portion of the pan in that sides extend therefrom both edges of the middle portion. The underside 31*b* and the reference plane 50 define a hollow region 57. The distal perimeter edges 58 extend up from the reference plane 50 and border the opening 60. As shown in FIG. 3, the distal perimeter edges 58 and reference plane 50 define the edges of the designed opening 60. As shown in these drawings the distal perimeter edges 58 are three straight lines, however the opening can have perimeter edges of many different perimeter edges 58 including as few as 2 lines to many more lines (combination of straight and/or not straight), an arched opening, a semi-circle, a partial oval, or a combination of all of these, geometrically regular or irregular.

As shown in FIGS. 1-3 the device 10 can also include winged baffles 55. these baffles can form a right angle or an oblique angle with the sides 40. In some embodiments the baffles 55 can direct or concentrate the flames into the opening 60.

As shown in FIG. 1 the proximal end 35 can also include end strip flange 39 that can extend up from perimeter edge 38. In some embodiments the strip flange 39 is substantially longer than shown. In some uses the device 10 can be tilted back and pushed along on strip flange 39.

Figure 4:
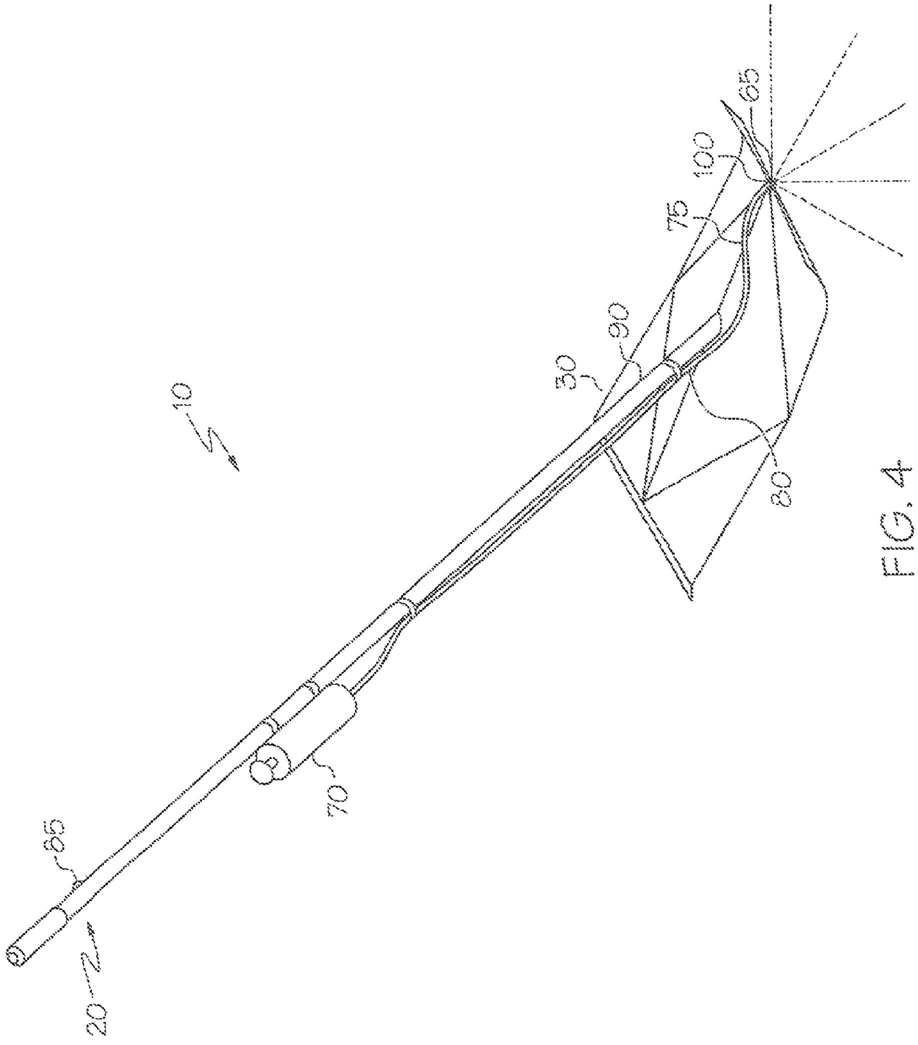
FIG. 4 is a schematic perspective view of an embodied fire extinguishing device showing the applicator.

As shown in FIG. 4 the device 10 can include a fire retardant applicator 65. The fire retardant applicator 65 can be a brush or role that is dipped into a container of fire retardant material and then applied to the fire. As shown in FIG. 4 the fire retardant applicator 65 is a hole or nozzle in which fire retardant material can be passed and applied to the flame or material in danger of being consumed. The nozzle/hole 65 can be in fluid communication with a pressurized reservoir/container 70 via tubing 75. As shown, a valve 80 which is controlled by a trigger 85 can be used in regulating the amount of material that passes through the applicator 65.

In some embodiments the reservoir/container 70 is in direct fluid communication with the applicator 65 in that no tubing or minimal tubing is used. In such an embodiment the container 70 can be located on the body 30 of the device 10. In some embodiments, the container 70 is not pressurized and is gravity fed. In some embodiments the tubing is of multiple pieces and connected by a coupling 90. The tubing can be made of fire and/or heat proof or resistant material. In some embodiments the tubing from the coupling 90 to the applicator 65 is composed of metal. In some embodiments the tubing between the container 70 and the coupling 90 is composed of a material different from that of the tubing between the coupling 90 and the applicator 65.

In some embodiments the trigger 85 activates the valve 80 mechanically, electrically, and/or pneumatically. In some embodiments the trigger is battery powered. In some embodiments the valve is opened and closed by squeezing a trigger 85 that pulls a tension wire attached to the valve 80.

In some embodiments the applicator 65 can be disposed in or proximal to a hole 100 in the body 30. Thus, spent or varying sized applicator brushes and/or nozzles can be removed and a replacement can be inserted. In some embodiments the applicator is the hole 100 itself.

In some embodiments, the container 70 is contained within the handle 20. The container 70 can be a part of the handle 20 as well; the hollow portion of the handle acting as a container.

In some embodiments the container 70 is not in direct contact with the device 10 as shown in FIG. 4. The container 70 can be located in a separate/remote area or on the operator via fasteners that attach to the operator's clothes and/or a backpack or harness.

In some embodiments the handle 20 can be removed from the body 30 and reattached. In some embodiments the handle can be shortened in length by folding or having at least length portions that slide within another length portion much like a sailor's telescope can be lengthened and shortened.

In some embodiments the device is at least composed in part of metal, heat resistant polymer/plastic, and/or ceramic.

Figure 5:
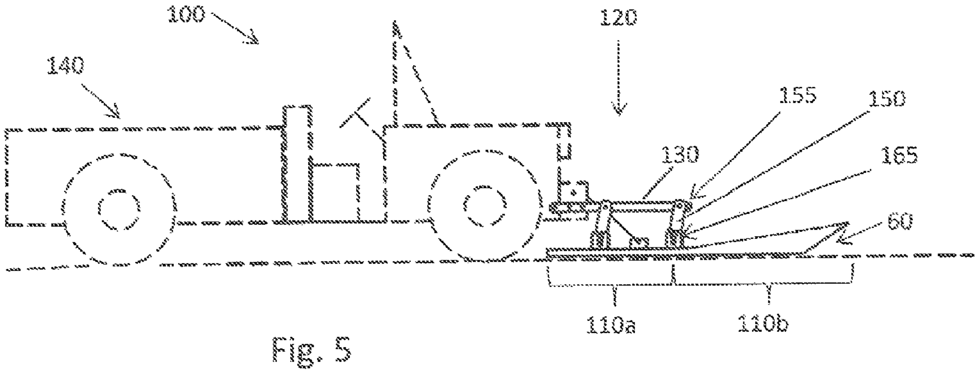
FIG. 5 is a side view of the inventive fire vehicle with the fire press attached in front.

In FIG. 5 the side view of a fire extinguishing vehicle is shown having a fire press portion 110 and connecting portion 120. The connecting portion includes at least one floating bar 130 that is attached to the push vehicle 140. The push vehicle 140 is outlined in dotted lines and can be any vehicle capable of pushing the fire press portion 110. Petroleum powered, coal powered, and/or electrically powered cars, trucks, trains, helicopters, lawn mowers, ATVs, tractors, motorcycles, three wheelers, bicycles, and the like are just some of the push vehicles 140 that can be used. The floating bar 130 may be substantially horizontal as shown, connecting to the push vehicle in a secure fashion as known in the connecting art. The floating bar 130 also connects to at least one transition bar 150, two shown in FIG. 5. In some embodiments the transition connector 155 that connects the transition bar 150 to the floating bar 130 allows for one or more degrees of freedom. In some embodiments, the connector 155 is a hinge type connection. In some embodiments, that is a bolt or pin at/of connector 155 that passes through holes in both the transition bar 150 and the float bar 130. This hinge movement can be about an axis of rotation preferably perpendicular to or parallel to the direction along the length of float bar 130. In some embodiments, the axis of rotation is oblique to the direction along the length of float bar 130.

In some embodiments the transition connector 155 has multiple degrees of freedom by including multiple hinge type connections. In some embodiments the transition connector 155 is one or more ball and socket connector(s).

The transition bars 150 then connect to the fire press portion 110. The connecting portion 120 keeps the fire press portion 110 lifted in such a way as to have the fire press portion 110 skim along at ground level thereby smothering fires. The fire press portion 110 can have an extended low profile portion 110*a* onto which the at least one transition rod 150 attaches. As shown two transition bars 150 attach to the low profile portion 110*a* of the fire press portion 110. In some embodiments, attachment can include primarily or partially attaching to the high profile section 110*b* of the fire press portion 110. In some embodiments the press connector 165 that connects the fire press 110 to the transition bar 150 allows for one or more degrees of freedom. In some embodiments, the connector 165 is a hinge type connection. In some embodiments, that is a bolt or pin at/of connector 165 that passes through holes in both the transition bar 150 and a portion of the fire press 110. This hinge movement can be about an axis of rotation preferably perpendicular to or parallel to the direction along the length of float bar 130. In some embodiments, the axis of rotation is oblique to the direction along the length of float bar 130.

In some embodiments the transition connector 165 has multiple degrees of freedom by including multiple hinge type connections. In some embodiments the transition connector 165 is one or more ball and socket connector(s).

In use the push vehicle 140 pushes the fire press portion 110 into an area that is ablaze. The opening 60 of the fire press portion 110 envelopes the burning area and smothers the flame with the concave portion sloping down from the opening to about ground level. The flames are smothered as the concave height of the high profile portion 110*b* diminishes down to the profile of the low profile portion 110*a*.

As shown in FIGS. 6*a* and 6*b*, the fire press portion 110 has a single opening 60.

In FIGS. 7*a*-7*b* the fire press portion 110 has multiple openings 60. As shown there are three openings 60. In some embodiments there are two openings 60. In other embodiments there are four or more openings 60.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A fire extinguishing vehicle having at least one pan, the at least one pan extending distally from a connection portion and forming a concave space within a middle portion, a first side wall, and a second side wall; the first and second side walls extending downwardly from opposite sides of the middle portion, the first and second side walls are shaped such that the middle portion slopes from a distal side where the side walls are longest to a proximal side where the side walls are shortest.

2. The fire extinguishing vehicle of claim 1 wherein the connection portion comprises at least one substantially horizontal float bar, at least one transition bar extending from the at least one float bar and connecting to the at least one pan.

3. The fire extinguishing vehicle of claim 1 wherein the middle portion, the first side wall, and the second side wall form a raised portion at the distal end having an arch-like opening into the concave space.

4. The fire extinguishing vehicle of claim 1 wherein the construction material of the pan is selected from the group consisting of metal, heat resistant polymer, and ceramic.

5. The fire extinguishing vehicle of claim 1 wherein the side walls and the proximal end of the middle portion extend to a single plane.

6. The fire extinguishing vehicle of claim 5 wherein the side walls bend such that a portion of each side wall lies substantially parallel to the single plane and the middle portion bends such that a portion of the middle portion lies substantially parallel to the single plane.

7. The fire extinguishing vehicle of claim 6 wherein the distal end of the concave portion extends farther from the single plane than the proximal end of the concave portion.

8. The fire extinguishing vehicle of claim 3 wherein the distal end of the side walls framing the arch-like opening have portions that flare away from the opening.

9. The fire extinguishing vehicle of claim 1 wherein the proximal end of the middle portion includes a flange.

10. The fire extinguishing vehicle of claim 9 wherein the flange extends at an oblique angle in relation to a plane formed by the middle portion.

11. The fire extinguishing vehicle of claim 1 having 2-5 pans.

12. The fire extinguishing vehicle of claim 1 wherein the intersection of the first side wall and the second side wall form the middle portion.

13. The fire extinguishing vehicle of claim 1 wherein the side walls are triangular.

14. The fire extinguishing vehicle of claim 1 wherein the side walls have multiple bends such that different portions of the side walls are in different planes.

15. The fire extinguishing vehicle of claim 1 wherein the at least one pan attaches to the connecting portion and is suspended just above the ground.

16. The fire extinguishing vehicle of claim 1 having temperature and flame resistant materials, these materials being used in the construction of vehicle parts selected from the group consisting of tires, chassis, treads, windows, hoses, engine, panels, and any combination thereof.

17. A fire extinguishing vehicle comprising a mobile vehicle having a connection portion and at least one pan, the at least one pan extending distally from the connection portion and forming a concave space and consisting essentially of a middle portion, a first side wall, and a second side wall; the first and second side walls extending downwardly from opposite sides of the middle portion, the first and second side walls are shaped such that the middle portion slopes from a distal side where the side walls are longest to a proximal side where the side walls are shortest; the middle portion, the first side wall, and the second side wall form a raised portion at the distal end having an arch-like opening into the concave space.

18. The fire extinguishing vehicle of claim 17 having 2-20 pans.

19. The fire extinguishing vehicle of claim 17 wherein the side walls and the proximal end of the middle portion extend to a single plane.

* * * * *